US008797389B2

(12) United States Patent
Miyasaka et al.

(10) Patent No.: US 8,797,389 B2
(45) Date of Patent: Aug. 5, 2014

(54) IMAGE PROCESSING APPARATUS, METHOD AND PROGRAM, AND DISPLAY APPARATUS

(75) Inventors: Daigo Miyasaka, Tokyo (JP); Junichirou Ishii, Tokyo (JP); Masao Imai, Tokyo (JP); Fujio Okumura, Tokyo (JP)

(73) Assignee: NEC Corporation, Tokyo (JP)

( * ) Notice: Subject to any disclaimer, the term of this patent is extended or adjusted under 35 U.S.C. 154(b) by 1015 days.

(21) Appl. No.: 12/528,339

(22) PCT Filed: Feb. 22, 2008

(86) PCT No.: PCT/JP2008/053093
§ 371 (c)(1),
(2), (4) Date: Sep. 14, 2009

(87) PCT Pub. No.: WO2008/102883
PCT Pub. Date: Aug. 28, 2008

(65) Prior Publication Data
US 2010/0013957 A1    Jan. 21, 2010

(30) Foreign Application Priority Data
Feb. 22, 2007 (JP) ................. 2007-042776

(51) Int. Cl.
*H04N 13/04* (2006.01)
*H04N 15/00* (2006.01)
*H04N 9/47* (2006.01)

(52) U.S. Cl.
USPC ............................................. 348/53; 348/54

(58) Field of Classification Search
USPC ................................................ 348/53, 54
See application file for complete search history.

(56) References Cited

U.S. PATENT DOCUMENTS 5,963,371 A * 10/1999 Needham et al. ............. 359/464
2002/0181025 A1* 12/2002 Yamaguchi .................. 358/3.28
(Continued)

FOREIGN PATENT DOCUMENTS

JP      62-065580 A      3/1987
JP      63-312788 A     12/1988
(Continued)

OTHER PUBLICATIONS

International Search Report for PCT/JP2008/053093 mailed Mar. 25, 2008.

(Continued)

*Primary Examiner* — Anner Holder
(74) *Attorney, Agent, or Firm* — Sughrue Mion, PLLC

(57) ABSTRACT

The invention provides: a code generation and data assignment circuit that sets the order in which a confidential image and a reversed image are displayed, based on an orthogonal code; and a shutter glass control signal generation circuit that controls so that during a period when an image signal of an image including at least part or all of the confidential image is outputted, the shutter glasses disposed between the succeeding display apparatus and the user's eyes are set in a light transmission state and during a period when another image is displayed, the shutter glasses are set in a light shielding state. The image signal of the confidential image and the image signal of the reversed image are in a relationship such that when the brightness values of the images are added together for each pixel, the resultant image has no correlation with the first output image.

28 Claims, 10 Drawing Sheets

(56) References Cited

U.S. PATENT DOCUMENTS

| | | | |
|---|---|---|---|
| 2003/0025667 A1* | 2/2003 | Yerazunis et al. | 345/102 |
| 2004/0022444 A1* | 2/2004 | Rhoads | 382/232 |
| 2006/0078158 A1 | 4/2006 | Liedenbaum et al. | |
| 2006/0221067 A1* | 10/2006 | Kim et al. | 345/204 |

FOREIGN PATENT DOCUMENTS

| | | |
|---|---|---|
| JP | 6-110403 A | 4/1994 |
| JP | 6-186506 A | 7/1994 |
| JP | 7-219489 A | 8/1995 |
| JP | 11-289557 A | 10/1999 |
| JP | 2001-255844 A | 9/2001 |
| JP | 2006523324 A | 10/2006 |
| WO | 2008/015905 A | 2/2008 |

OTHER PUBLICATIONS

Japanese Office Action for JP2009-500255 mailed on Jun. 12, 2012.

\* cited by examiner

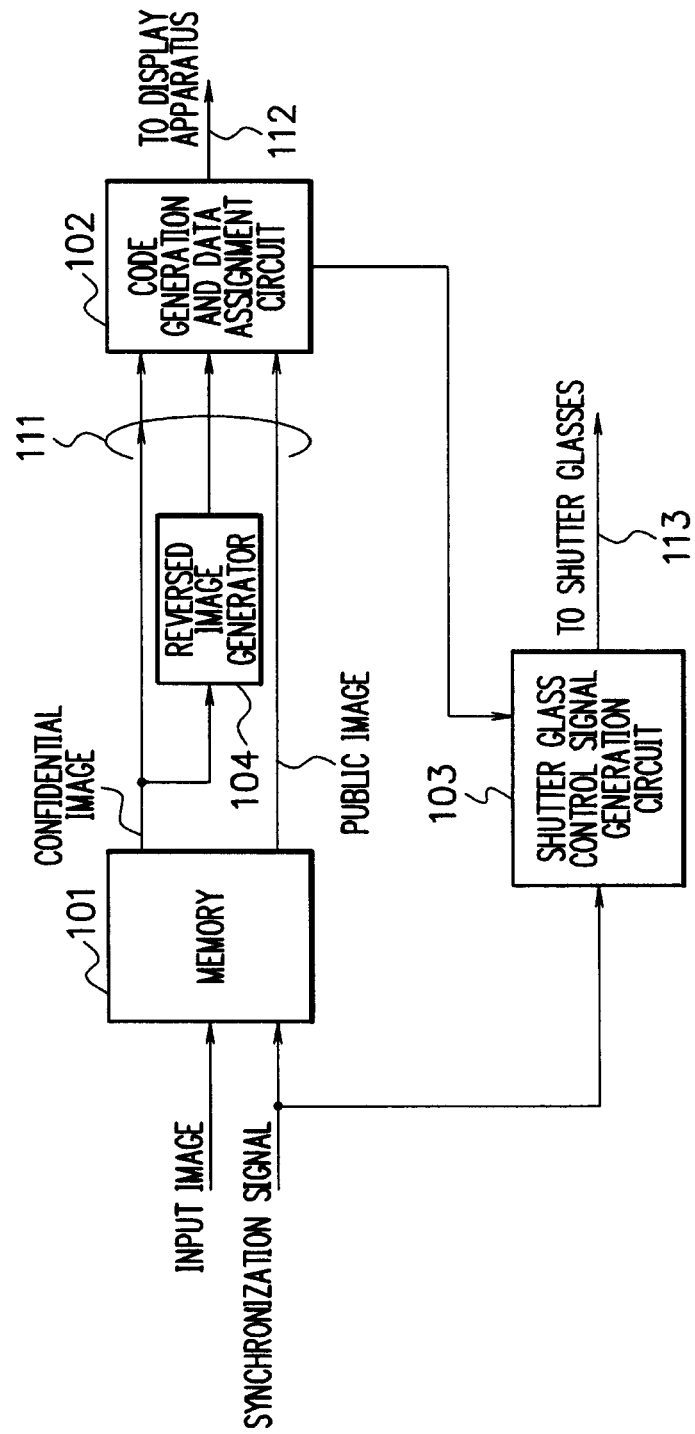
F I G. 7

F I G. 9
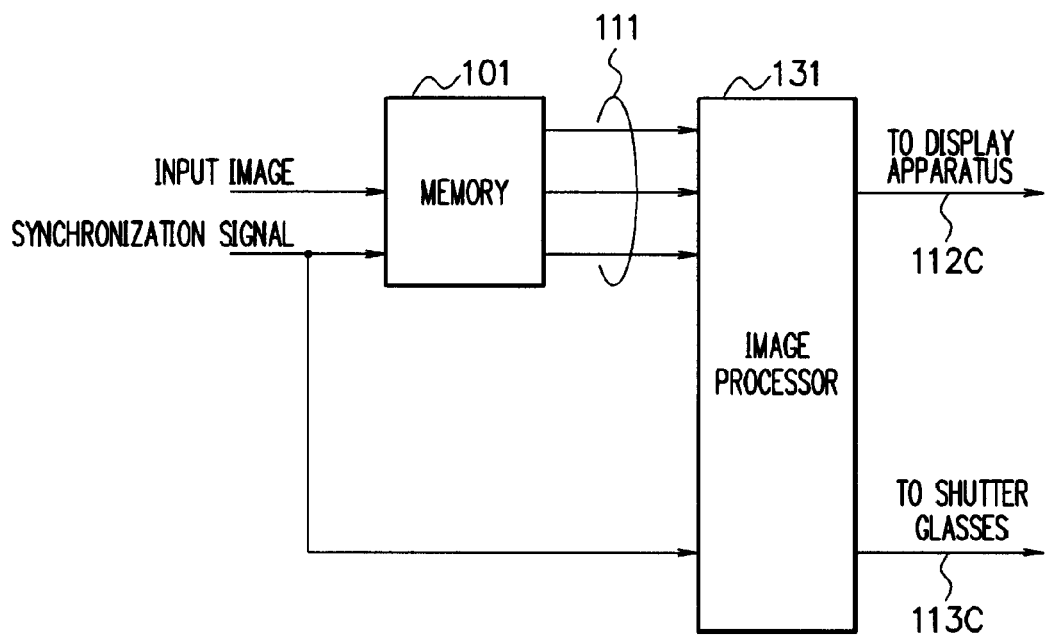

US 8,797,389 B2

IMAGE PROCESSING APPARATUS, METHOD AND PROGRAM, AND DISPLAY APPARATUS

This application is the National Phase of PCT/JP2008/053093, filed Feb. 22, 2008, which is based upon and claims priority to Japanese Patent Application No. 2007-042776, filed Feb. 22, 2008, the disclosure of which is incorporated herein in its entirety by reference.

TECHNICAL FIELD

The present invention relates to an image processing apparatus, method and program, and a display apparatus, and more particularly, relates to an apparatus, a method and a program capable of presenting the contents to a specific user and an authenticated person.

BACKGROUND ART

Flat-panel displays including liquid crystal displays and plasma displays are applied to a wide variety of apparatuses ranging from mobile apparatuses such as mobile telephone terminals to large-size apparatuses such as public displays placed in streets. Many of such displays are developed with emphasis on realizing a wide angle of visibility, high brightness and high image quality, and have been required to display contents beautifully and so as to be easy to view from any angle.

On the other hand, contents displayed on displays include ones such as confidential information and private data that should not be seen by others. Therefore, at the present time when progress is being made toward ubiquitousness with the development of information apparatuses, preventing displayed contents from being seen by others even in public space where there are unspecified people is an important problem.

In addition, even in a place such as an office where there are only specified people, there are cases where confidential information is handled that should not be seen by persons who pass behind the seat.

Some of the mobile telephone terminals and the like are provided with a display having an optical shielding plate or a louver film_so that the display contents can be visually recognized only from a specific direction. However, since the display contents can be furtively seen from directly behind the user, this structure is not sufficient from the viewpoint of the preservation of confidentiality.

A technology related to solving these problems is an "image display apparatus" disclosed in Patent Document 1. This image display apparatus is an apparatus that enables, by making the user wear glasses having an image selection function, only a person (user) wearing the glasses to visually recognize a specific image (hereinafter, referred to as confidential image) and presents a different image (hereinafter, referred to as public image) to other persons.

Specifically, in the image display apparatus shown in FIG. 1, one frame of input image signal 11 is stored in an image information storage memory 12 based on a frame signal 13. Then, the image information is read from the memory 12 at a speed twice the frame period (that is, read twice during one frame period), the signal that is read first is compressed to ½ and inputted to a synthesis circuit 15 as a first image signal 14, and the image signal that is read next has its chroma and brightness converted by a chroma and brightness conversion circuit 16 and inputted to the synthesis circuit 15 as a second image signal 17. Consequently, the first image signal 14 and the second image signal 17 are alternately displayed on an image display 18.

On the other hand, the frame signal 13 is also inputted to a glass shutter timing generation circuit 19. The glass shutter timing generation circuit 19 drives the shutter of glasses 21, and controls the glass shutter so that the image by the second image signal 17 is not seen by the user.

With such a structure and operation, persons not wearing the glasses 21 see a gray image which is a synthetic image of the first image signal 14 and the second image signal 17 and which is not related to the first image signal 14, or a third image (public image), and persons wearing the glasses 21 see a desired image (confidential image) based on the first image signal 14.

With a similar structure, a plurality of persons can selectively view different images with one display apparatus. A technology related thereto is a "television multiple display system" disclosed in Patent Document 2.

In the television multiple display system disclosed in Patent Document 2, a plurality of programs are sequentially shown within the afterimage remaining time in a time-sharing manner on one image display screen and glasses having a shutter function are caused to operate in time-sharing cycles, whereby a plurality of viewers can simultaneously watch desired programs independently of each other.

In the inventions disclosed in Patent Document 1 and Patent Document 2, there is a problem in that a person viewing a confidential image or a desired program by using the shutter glasses can view another confidential image or program displayed on the same display apparatus by changing the phase of the opening and closing timing of the shutter glasses (see FIG. 2 of Patent Document 1 and FIG. 5 of Patent Document 2).

There is also a problem in that when the number of confidential images or programs is increased, the period during which the shutter glasses are open (ON period) is decreased in inverse proportion to the number of images or the number of programs and this makes dark the confidential image or the program viewed through the shutter glasses.

Another related technology for solving the above problem of preventing the displayed contents from being seen by others even in an environment where there are unspecified people is a "method of providing data that can be privately viewed on a display that can be viewed by the public" disclosed in Patent Document 3. According to the method disclosed in Patent Document 3, only authorized users are enabled to make out the private image (confidential image) on the display, and at the same time, unauthorized users are made to see, as the public image, merely a random pattern or a pattern that is difficult to make out, or an image such as a screen saver image.

To promote this purpose, according to the invention disclosed in Patent Document 3, an image processing technique including a data concealment pattern and an alternation pattern is synchronized with a display incorporating an image created by an image processing technology (for example, combined with a wearable device such as active glasses). Lastly, by the "known ability to fuse dissimilar images into a single image" of the human visual system, the capability is completed to provide data that can be privately seen on a display that can be seen by the public.

For the problem in that a person viewing a confidential image or a desired program by using the shutter glasses can view another confidential image or program by changing the phase of the opening and closing timing of the shutter glasses, by randomizing the opening and closing timing of the shutter by using a (pseudo) random number generator, the invention disclosed by Patent Document 3 can make it substantially impossible to completely view another confidential image or program even when shutter glasses in which the frequency and the phase can be changed are used.

Patent Document 1: Japanese Patent Application Publication Laid-Open No. S63-312788

Patent Document 2: Japanese Patent Application Publication Laid-Open No. S62-65580

Patent Document 3: Japanese Patent Application Publication Laid-Open No. 2001-255844

DISCLOSURE OF THE INVENTION

Problem to be Solved by the Invention

However, according to the invention disclosed in Patent Document 3, since it is based on a random number, it cannot be avoided that a period during which confidential images are continuously outputted is generated, and in this case, the following new problems arise:

(1) There is a possibility that a person not having the shutter glasses views confidential images.

(2) Since the image switching frequency is decreased, the opening and closing frequency of the shutter glasses is decreased accordingly, so that flicker is detected.

According to the invention disclosed in Patent Document 3, the opening and closing timing is arbitrary as long as no flicker occurs (see 0029 of Patent Document 3), and as a concrete method therefor, an example is cited in which the opening and closing timing is randomly generated at a frame frequency of 120 Hz. However, under such a condition, if the "open state" continues three times, the frequency component of the signal becomes not more than 40 Hz, and flicker is inevitably detected. That is, with the random cycle time like that of the invention disclosed in Patent Document 3, it cannot be avoided that flicker is detected.

Although it is common knowledge to generate an opening and closing timing where no flicker occurs when a plurality of images are switchingly displayed, the invention disclosed in Patent Document 3 does not solve this problem and lacks practicality.

The present invention is made in view of such a problem, and an exemplary object thereof is to provide an image processing apparatus, method and program, and a display apparatus in which high confidentiality is provided and no flicker is detected even when confidential images are viewed through shutter glasses.

Means for Solving the Problem

To attain the above-mentioned exemplary object, the present invention provides, as a first exemplary aspect, an image processing apparatus that sequentially outputs at least two image signals, wherein an image signal of a first output image and an image signal of a second output image are in a relationship such that when brightness values of the images are added together for each pixel, a resultant image has no correlation with the first output image, an order in which the first output image and the second output image are displayed is set based on an orthogonal code, and the image processing apparatus includes optical shutter control means for controlling so that during a period when an image signal of an image including at least part or all of the first output image is outputted, a shutter disposed between a display apparatus displaying the image corresponding to the image signal and user's eyes is set in a light transmission state and during a period when another image is displayed, the shutter is set in a light shielding state.

Moreover, to attain the above-mentioned exemplary object, the present invention provides, as a second exemplary aspect, an image processing apparatus that sequentially outputs at least two image signals, wherein the image processing apparatus includes reversed image generation means for generating a second output image so that an image signal of a first output image and an image signal of the second output image are in a relationship such that when brightness values of the images are added together for each pixel, a resultant image has no correlation with the first output image, an order in which the first output image and the second output image are displayed is set based on an orthogonal code, and the image processing apparatus includes optical shutter control means for controlling so that during a period when an image signal of an image including at least part or all of the first output image is outputted, a shutter disposed between a display apparatus displaying the image corresponding to the image signal and user's eyes is set in a light transmission state and during a period when another image is displayed, the shutter is set in a light shielding state.

In the first or the second exemplary aspect of the present invention, it is preferable that the image signal of the first output image is outputted when an element value of the orthogonal code is "1" and the image signal of the second output image is outputted when the element value is "−1".

In any of the structures of the first and the second exemplary aspects of the present invention, it is preferable that the image processing apparatus includes means for randomly changing the orthogonal code for each frame. Moreover, it is preferable that when the first element value of the orthogonal code used for a current frame and the last element value of the orthogonal code used for a preceding frame are the same value, the element value of the orthogonal code used for the current frame is reversed. Moreover, it is preferable that an image signal of a third output image is outputted together with the image signal of the second output image during the period state when the shutter is set in the light shielding state.

Moreover, to attain the above-mentioned exemplary object, the present invention provides, as a third exemplary aspect, an image processing method for sequentially outputting at least two image signals, including: a step of setting an order in which a first output image and a second output image are displayed, based on an orthogonal code; and an optical shutter control step of controlling so that during a period when an image signal of an image including at least part or all of the first output image is outputted, a shutter disposed between a display apparatus displaying the image corresponding to the image signal and user's eyes is set in a light transmission state and during a period when another image is displayed, the shutter is set in a light shielding state, wherein an image signal of the first output image and an image signal of the second output image are in a relationship such that when brightness values of the images are added together for each pixel, a resultant image has no correlation with the first output image.

Moreover, to attain the above-mentioned exemplary object, the present invention provides, as a fourth exemplary aspect, an image processing method for sequentially outputting at least two image signals, including: a reversed image generation step of generating a second output image so that an image signal of a first output image and an image signal of the second output image are in a relationship such that when brightness values of the images are added together for each pixel, a resultant image has no correlation with the first output image; a step of setting an order in which the first output image and the second output image are displayed, based on an orthogonal code; and an optical shutter control step of controlling so that during a period when an image signal of an image including at least part or all of the first output image is outputted, a shutter disposed between a display apparatus displaying the image corresponding to the image signal and user's eyes is set in a light transmission state and during a period when another image is displayed, the shutter is set in a light shielding state.

In the third or the fourth exemplary aspect of the present invention, it is preferable that the image signal of the first output image is outputted when an element value of the orthogonal code is "1" and the image signal of the second output image is outputted when the element value is "−1".

In any of the methods of the third and the fourth exemplary aspects of the present invention, it is preferable that the image processing method includes a step of randomly changing the orthogonal code for each frame. Moreover, it is preferable that when the first element value of the orthogonal code used for a current frame and the last element value of the orthogonal code used for a preceding frame are the same value, the element value of the orthogonal code used for the current frame is reversed. Moreover, it is preferable that an image signal of a third output image is outputted together with the image signal of the second output image during the period when the shutter is set in the light shielding state.

Moreover, to attain the above-mentioned exemplary object, the present invention provides, as a fifth exemplary aspect, an image processing program that causes a computer to execute the image processing method according to any of the third and the fourth exemplary aspects of the present invention.

To attain the above-mentioned exemplary object, the present invention provides, as a sixth exemplary aspect, a display apparatus that sequentially displays images corresponding to at least two image signals, by display means, wherein an image signal of a first output image and an image signal of a second output image are in a relationship such that when brightness values of the images are added together for each pixel, a resultant image has no correlation with the first output image, an order in which the first output image and the second output image are displayed is set based on an orthogonal code, and the display apparatus includes optical shutter control means for controlling so that during a period when an image signal of an image including at least part or all of the first output image is outputted, a shutter disposed between the display means and user's eyes is set in a light transmission state and during a period when another image is displayed, the shutter is set in a light shielding state.

Moreover, to attain the above-mentioned exemplary object, the present invention provides, as a seventh exemplary aspect, a display apparatus that sequentially displays images corresponding to at least two image signals, by display means, wherein the display apparatus includes reversed image generation means for generating a second output image so that an image signal of a first output image and an image signal of the second output image are in a relationship such that when brightness values of the images are added together for each pixel, a resultant image has no correlation with the first output image, an order in which the first output image and the second output image are displayed is set based on an orthogonal code, and the display apparatus includes optical shutter control means for controlling so that during a period when an image signal of an image including at least part or all of the first output image is outputted, a shutter disposed between the display means and user's eyes is set in a light transmission state and during a period when another image is displayed, the shutter is set in a light shielding state.

Effects of the Invention

According to the present invention, an image processing apparatus, method and program, and a display apparatus can be provided in which confidentiality is high and no flicker is detected even when confidential images are viewed through shutter glasses.

Best Mode for Carrying out the Invention

[Principle of the Invention]

According to the above-described related technologies, when a plurality of persons view different confidential images with the same display apparatus, the display period of each confidential image is set within one frame period and the confidential image is exclusively displayed. During the period when no confidential image is displayed, the sum of the brightness reversed images (hereinafter, referred to as reversed images) of the respective color components of all the confidential images is displayed so that persons having no shutter glasses cannot view the confidential images.

In the case of such a display method, the following problems arise:

(1) When the number of groups of confidential images (the number of persons viewing different images) is increased, the period during which the shutter glasses are open (ON period) is decreased in inverse proportion to the number of confidential images, so that the images viewed through the shutter glasses are dark.

(2) By changing the phase of the opening and closing timing of the shutter glasses, a person viewing a confidential image through the shutter glasses can view other confidential images displayed on the same display apparatus.

FIG. 2 shows the display sequence and the transmission and light shielding states of the shutter glasses according to the conventional method for a plurality of persons to view different confidential images with one display apparatus. In FIG. 2, three different confidential images A, B and C are displayed on one display apparatus. One frame is divided into four subframes. The confidential image A is displayed in a subframe 1, the confidential image B is displayed in a subframe 2, and the confidential image C is displayed in a subframe 3. In a subframe 4, the sum A'+B'+C' of the reversed images for canceling out the confidential images is displayed. Here, A', B' and C' represent the reversed images of the confidential images A, B and C, respectively. The shutter glasses A, B and C are in the transmission state only for the subframes 1, 2 and 3, respectively, and are in the light shielding state during the other periods.

Consequently, persons having no shutter glasses view an image which is the integral of the confidential images A to C and the reversed images A' to C' thereof, and cannot view the confidential images. Persons having the shutter glasses A, B and C can view only the confidential images A, B and C, respectively.

However, since the opening and closing sequences of the respective pairs of shutter glasses are different only in phase, confidential images of other persons can be easily viewed with shutter glasses in which the phase can be adjusted.

Accordingly, in the present invention, the opening and closing sequence is set by using orthogonal codes.

The orthogonal codes are expressed by a matrix having elements of +1 and −1, and have a characteristic that the inner product of the codes orthogonal to each other is 0. Therefore, as the opening and closing sequence of the shutter glasses, the transmission state is represented by +1, the light shielding state is represented by −1, a different orthogonal code is assigned to each pair of shutter glasses, +1 is assigned to confidential image display, and −1 is assigned to reversed image display, whereby it is made impossible to view other confidential images with shutter glasses to which a different orthogonal code is assigned.

Moreover, of the orthogonal codes, the code the elements of which are all +1 represents persons having no shutter glasses because it indicates being always in the transmission state. Consequently, since the code is orthogonal to the other codes, the confidential images cannot be viewed.

FIG. 3 shows the display sequence and the transmission and light shielding states of the shutter glasses of the present invention for a plurality of persons to view different confidential images with one display apparatus. In FIG. 3, as in FIG. 2, three different confidential images are displayed on one display apparatus, and one frame is divided into four subframes.

As Walsh codes which are orthogonal codes with a length of four, the following four are present: (+1, +1, +1, +1), (+1, −1, +1, −1), (+1, +1, −1, −1) and (+1, −1, −1, +1), and the three codes other than the one consisting of only +1 are used for the image display and the opening and closing sequence of the shutter glasses.

That is, assignment is made so that in the display sequence, +1 represent a confidential image and −1 represents a reversed image and in the control of the shutter glasses, +1 represents the transmission state and −1 represents the light shielding state. The shutter glasses A use the code (+1, +1, −1, −1), the shutter glasses B use the code (+1, −1, −1, +1), and the shutter glasses C use the code (+1, −1, +1, −1).

When the codes are assigned as mentioned above, an image which is the sum of the three images represented by A+B'+C is displayed in the first subframe, A+B+C' is displayed in the second one, A'+B+C is displayed in the third one, and A'+B'+C' is displayed in the fourth one.

As the sum image of the three images, the sum of the brightness values of the images may be displayed by using the entire screen, or an image obtained by resolving each of the images A, B and C into pixels and rearranging them may be displayed. Further, it may be performed to divide the screen into a plurality of areas and the images A, B and C are displayed in the areas, respectively. In this case, although each display screen is small, since the confidential images do not overlap with respect to space, the image contrast when the confidential images are displayed is not reduced.

At this time, with respect to the shutter glasses A, it is the subframe 1 and the subframe 2 that are in the transmission state. The images that the person having the shutter glasses A views during the subframe periods are A+B'+C and A+B+C', respectively, and perceives the integral of these images. Since B and B', and C and C' cancel out with each other to form images uncorrelated with the confidential images, the person having the shutter glasses A can view only the confidential image A. Likewise, when the shutter glasses B or the shutter glasses C are used, only the confidential image B or the confidential image C can be viewed, respectively.

According to this method, since each pair of shutter glasses is not exclusively in the transmission state with respect to time and is in the transmission state without fail during half of one frame period, the confidential images are never dark even if the number of confidential image groups is increased.

Moreover, the following two methods may be adopted as methods for making it impossible to view other confidential images even when the phase of each pair of shutter glasses is shifted.

One method is to restrict codes that are used simultaneously. As in the above-described example, Walsh codes with a length of four are used as an example. In the case of the code (+1, +1, −1, −1) assigned to the shutter glasses A and the code (+1, −1, −1, +1) assigned to the shutter glasses B, since the frequency components of the codes are the same, if the phase is shifted 90 degrees, other confidential images can be viewed. On the other hand, when the code (+1, −1, +1, −1) assigned to the shutter glasses C and the code (+1, +1, −1, −1) assigned to the shutter glasses A are used, the frequency components of the codes are just multiples of 2. That is, when the assigned codes are continued, the code assigned to the shutter glasses C is a code of a two-element period since (+1, −1) is the unit of repetition, and the code assigned to the shutter glasses A is a code of a four-element period since (+1, +1, −1, −1) is the unit of repetition. Therefore, other confidential images cannot be viewed even if the phase is shifted. As described above, it can be made impossible to view other confidential images by selectively using only orthogonal codes having different frequency components.

Another method is to randomly select a code for each frame. This can be implemented by using a pseudo random number generator such as a linear feedback shift register (LFSR). By randomly selecting a code, the leakage of confidential images can be prevented.

Next, a method will be described for preventing both persons not having the shutter glasses and persons having the shutter glasses from perceiving flicker when orthogonal codes are used. To prevent the users from perceiving flicker, the frequency of switching between the confidential image and the reversed image is made higher than the upper limit of the frequency where flicker is perceived. To do this, it is desirable to satisfy any of the following two conditions:

(1) The frame frequency is made higher than the upper limit of the frequency where flicker is perceived. Alternatively, it may be performed to select a code where the change between +1 and −1 occurs at least three times (for example, (+1, −1, +1, −1)) as the orthogonal code and make the frequency twice the frame frequency higher than the upper limit of the frequency where flicker is perceived. By selecting such a frequency, the users never perceive flicker. It is desirable that the frequency where no flicker is perceived be not less than 50 Hz.

(2) The element values sandwiching the border between the codes assigned to two adjoining frames are made different. For example, in a case where the code of the preceding frame is (+1, −1) and the code of the succeeding frame is (−1, +1) when codes are selected, since a code string of a two-frame period results, it is perceived as flicker. Therefore, in such a case, the code of the current frame is reversed to (+1, −1). Even if a code is reversed, the orthogonality with the other code is not lost.

By satisfying such conditions, the problem of the perception of flicker is solved.

While a case where a plurality of confidential images are viewed with the same display apparatus is described as an example in the above, it can also be made difficult to view, when different confidential images are viewed on different display apparatuses by using different pairs of shutter glasses, respectively, the confidential images on the other display apparatus without perceiving any flicker. For example, in a case where a plurality of display apparatuses are arranged as in offices and in a case where a person sitting on the next seat is using a notebook computer having a similar display apparatus on a vehicle, the generation of flicker can be prevented while the person on the next seat is prevented from viewing the confidential images on the display apparatus for the user himself or herself. Specifically, when the three different confidential images A, B and C in FIG. 3 are displayed on different display apparatuses and the shutter glasses A, B and C for viewing the confidential images, respectively, are used, the display sequence and the shutter glass transmission and light shielding states are controlled so as to be ones similar to those of FIG. 3.

While only confidential images and reversed images are used in the description given above, it is possible to provide display so that persons having no shutter glasses can view public images.

One method for displaying public images is to add public images to reversed images.

Another method is to add a value of "0" for displaying public images to orthogonal codes. For example, even if 0 is added to the ends of three orthogonal codes (+1, −1, +1, −1), (+1, +1, −1, −1) and (+1, −1, −1, +1) into (+1, −1, +1, −1, 0), (+1, +1, −1, −1, 0) and (+1, −1, −1, +1, 0), the effects of the present invention do not change.

Further, while the displayed images are images complete for each subframe in the description given above, it may be performed to distribute an image to a plurality of subframes (that is, display a part of an image in each subframe) so that the result of addition of the subframe images is a complete image. By doing this, it can be made difficult to grasp the contents by only a single subframe image, so that the ensuring of further confidentiality such as tapping prevention is made possible.

By applying the above-described method to an image processing apparatus or a display apparatus as shown below, persons having the shutter glasses can be prevented from easily viewing other confidential images, and the confidentiality when confidential images are displayed is enhanced without any flicker being perceived.

By setting the display sequence of confidential images and reversed images by using orthogonal codes and setting the opening and closing sequence of the shutter glasses in accordance therewith as the image processing apparatus, the confidentiality when confidential images are displayed is enhanced.

Moreover, by displaying confidential images and reversed images based on the display sequence set by using orthogonal codes and setting the opening and closing sequence of the shutter glasses in accordance therewith as the display apparatus, confidential images can be displayed with high confidentiality.

Hereinafter, exemplary embodiments of the present invention based on the above-described principle will be described.

[First Exemplary Embodiment]

A first exemplary embodiment where the present invention is preferably carried out will be described. FIG. 4 shows the structure of an image processing apparatus according to the exemplary embodiment. This image processing apparatus is a concrete apparatus that performs a processing based on the principle of the present invention. The image processing apparatus includes a memory 101, a code generation and data assignment circuit 102 and a shutter glass control signal generation circuit 103. The memory 101 stores sequentially inputted confidential images, reversed images and public images. The code generation and data assignment circuit 102 outputs the confidential images, reversed images and public images sequentially outputted from the memory 101 based on a synchronization signal, to the display apparatus based on orthogonal codes generated inside. The shutter glass control signal generation circuit 103 controls the light transmission state and the light shielding state of the shutter glasses based on the inputted synchronization signal and the orthogonal codes from the code generation and data assignment circuit 102.

In FIG. 4, the output signal of the memory 101 is represented by reference numeral 111, the output signal of the code generation and data assignment circuit 102 is represented by reference numeral 112, and the output signal of the shutter glass control signal generation circuit 103 is represented by reference numeral 113.

The confidential images, reversed images and public images stored in the memory 101 are sent to the code generation and data assignment circuit 102. The code generation and data assignment circuit 102 performs data assignment of the output confidential images, the output reversed images and the output public images for each period based on the orthogonal codes generated inside, and outputs them to the display apparatus.

FIG. 5 shows the structure of the code generation and data assignment circuit 102. The code generation and data assignment circuit 102 includes a pseudo random number generator 122, an orthogonal code generator 123 and a data assignment circuit 121. The orthogonal code generator 123 selects the orthogonal code to be sent to the data assignment circuit 121 and the shutter glass control signal generation circuit 103 based on the random number generated by the pseudo random number generator 122. For example, the orthogonal code generator 123 is provided with a table, and outputs a value corresponding to the value inputted from the pseudo random number generator 122. Then, the data assignment circuit 121 assigns image data to be sent to the display apparatus, based on the selected orthogonal code.

FIG. 6 shows an example of the timing chart of one-frame periods of the output signals 111, 112 and 113. The processing at the data assignment circuit 121 will be described based on this timing chart. In this example, the confidential images B and C and the reversed images B' and C' for the shutter glasses B and C are omitted, and only the confidential image A and the reversed image A' for the shutter glasses A and a public image P are shown.

In the frame shown in FIG. 6, a code (+1, −1, 0, 0, +1, −1) is assigned to the shutter glasses A, a code (+1, +1, 0, 0, −1, −1) is assigned to the shutter glasses B, and a code (+1, −1, 0, 0, −1, +1) is assigned to the shutter glasses C. Each pair of shutter glasses is controlled so as to be in the transmission state during the periods where (+1) is assigned and be in the light shielding state during the periods where "−1" and "0" are assigned.

The data assignment circuit 121 receives the confidential image A, the reversed image A' and the public image P, performs data assignment of the confidential image A in periods Ton1 and Ton2 corresponding to "+1" of the code (+1, −1, 0, 0, +1, −1), performs data assignment of the reversed image A' in, of periods Toff1 and Toff2, the periods corresponding to "−1", and performs data assignment of the public image P in the periods corresponding to "0".

In the period Ton1, first, the gradation value of the confidential image A is sent to each pixel of the screen of the display apparatus in a data writing period W. Then, light emission (in the case of a self-emissive display such as a plasma display or an organic electroluminescent display), or the light transmission state (in the case of a light control display such as a display using an MEMS switch or a liquid crystal display) or the non-light emission and light shielding state of the pixels is maintained until the next writing period W comes.

Then, in the period Toff1, data assignment of the reversed image A' and the public image P is performed by similar steps (the writing step and the light emission and light transmission state maintenance step) to those in the period Ton1, and gradation expression of each image is performed.

In the periods Ton2 and Toff2, data assignment of the confidential image A and the reversed image A' is performed by similar steps to those in Ton1 and Toff1, and gradation of each image is performed.

The output signal 113 of the shutter glass control signal generation circuit 103 sets the shutter glasses A in the light transmission state during the periods Ton1 and Ton2, and sets the shutter glasses A in the light shielding state during the periods Toff1 and Toff2. The output signal 113 which is a shutter glass control signal is generated based on a video synchronization signal. Persons having the shutter glasses A can view only the confidential image A. On the other hand, persons having the shutter glasses B and C cannot perceive the confidential image A since they both see the confidential image A and the reversed image A' when the shutter glasses B and C are in the light transmission state.

Moreover, the transmission period of the shutter glasses is not limited to the display period of the confidential image but may be the display period of the confidential image and the public image. By viewing the public image and the confidential image superimposed on one another, the auxiliary information of the public image can be presented as a confidential image to persons wearing the shutter glasses.

As described above, by setting the display of image data and the opening and closing sequence of the shutter glasses based on the orthogonal codes generated by the code generation and data assignment circuit 102, confidential image display with high confidentiality can be realized.

[Second Exemplary Embodiment]

A second exemplary embodiment where the present invention is preferably carried out will be described. While an image processing apparatus according to the exemplary embodiment has a substantially similar structure to that of the image processing apparatus according to the first exemplary embodiment, it is different from the first exemplary embodiment in that a reversed image generator is provided.

FIG. 7 shows the structure of the image processing apparatus according to the exemplary embodiment. The reversed image generator 104 receives the confidential image from the memory 101, generates a reversed image based thereon, and outputs the reversed image.

The reversed image generator 104 generates, as the reversed image that cancels out the confidential image, an image of a value (gradation value, etc.) corresponding to a brightness which is the brightness at the time of "white" display of the confidential image when the reversed image is added to the confidential image. This is because the integral of not the gradation but the brightness is perceived on the retina. By generating such a reversed image, it is unnecessary to store the reversed image in the memory 101, so that the memory capacity can be reduced.

With this structure, even when an inexpensive small-capacity memory is used, effects similar to those of the first exemplary embodiment are obtained.

[Third Exemplary Embodiment]

A third exemplary embodiment where the present invention is preferably carried out will be described. FIG. 8 shows the structure of a display apparatus according to the exemplary embodiment. There is no particular limitation to the display apparatus; a plasma display, a display using an MEMS switch, an organic electroluminescent display, a high-speed liquid crystal display or the like is applicable.

This display apparatus is a concrete apparatus that performs a processing based on the principle of the present invention, and includes a memory 201, a display controller 105, a shutter glass control signal generation circuit 203 and a display portion 106.

The memory 201 stores sequentially inputted confidential images, reversed images and public images. The display controller 105 sets the display order in which the confidential images, reversed images and public images sequentially outputted from the memory 201 based on a synchronization signal are outputted to the display portion 106 based on orthogonal codes generated inside, and generates a control signal for driving the display portion 106 and an image signal. The shutter glass control signal generation circuit 203 controls the light transmission state and the light shielding state of the shutter glasses based on the inputted synchronization signal and orthogonal codes. An output signal 211 from the memory 201, an output signal 212 from the display controller 105 and an output signal 213 from the shutter glass control signal generation circuit 203 are similar to the output signals 111, 112 and 113 in the first exemplary embodiment, respectively.

By incorporating, in the display controller 105, the processing at the code generation and data assignment circuit in the first exemplary embodiment as in the present exemplary embodiment, it is possible to cause the display apparatus to perform the code generation and data assignment processing.

Thereby, the confidentiality when confidential images are displayed is enhanced.

When different confidential images are viewed on adjoining different display apparatuses by using different pairs of shutter glasses, respectively, the display apparatuses share the orthogonal code generator by using communication means or the like.

[Fourth Exemplary Embodiment]

A fourth exemplary embodiment where the present invention is preferably carried out will be described. The image processing of the exemplary embodiment may be executed as software processing using a computer. That is, as shown in FIG. 9, in the exemplary embodiment, an image processor 131 is constituted by substantial software processing by a computer.

FIG. 10 shows the flow of the image processing at the image processor 131 according to the exemplary embodiment. This image processing is to set the image display order and the transmission and light shielding states of the shutter glasses by using orthogonal codes generated based on the number SUB of subframes of the display apparatus when a confidential image Sin, a reversed image Rin and a public image Pin which are each an 8-bit raster image are inputted.

Associating the processing at each step with the image processing apparatus according to the first exemplary embodiment, steps S2 to S5 correspond to the processing at the pseudo random number generator 122 and the orthogonal code generator 123, step S6 corresponds to the processing at the data assignment circuit 121, and steps S7 to S9 correspond to the processing at the shutter glass control signal generation circuit 103.

The confidential image Sin, the reversed image Rin and the public image Pin (eight bits) are inputted to the image processor 131 (step S1).

"Orthogonal Code Selection Processing"

The image processor 131 first obtains the number SUB of subframes (step S2), and generates orthogonal codes based thereon (step S3).

Then, a pseudo random number PRN is generated (step S4), and from among the orthogonal codes generated at step S3, an arbitrary one is selected based on the pseudo random number PRN (step S5).

"Data Assignment Processing"

From the orthogonal code selected at step S5, an element of the orthogonal code is selected according to the ordinal position of the currently outputted subframe. An image is selected according to the selected element and outputted as an output signal 112C. Specifically, 1:Sout, −1:Rout, 0:Pout are selected (step S6).

"Shutter Glass Control Signal Generation Processing"

It is checked whether the selected image is a confidential image or not (step S7). When it is a confidential image, a shutter glass control signal to set the shutter glasses in the transmission state is outputted as the output signal 113C (step S8), and when it is not, a shutter glass control signal to set the shutter glasses in the light shielding state is outputted as the output signal 113C (step S9).

By performing the processing of steps S1 to S9 by software processing by a computer, an image processing similar to that of the image processing apparatus according to the first exemplary embodiment can be executed without the use of special hardware.

While the flowchart shown in FIG. 10 is to perform a similar image processing to that of the image processing apparatus according to the first exemplary embodiment of the present invention, a similar image processing to that of the image processing apparatus according to the second exemplary embodiment may also be performed by software processing using a computer.

The above-described exemplary embodiments are merely examples of preferred exemplary embodiments of the present invention, and the present invention is not limited thereto.

For example, while no particular description is given as to R, G and B signals in the above-described exemplary embodiments, similar effects are obtained for color images by providing a similar structure to that of any of the above-described exemplary embodiments for each signal component.

However, the raster images are not necessarily color images constituted by image signals of a plurality of colors but may be monochrome images. That is, it is not always necessary for the structure shown in any of the above-described exemplary embodiments to be provided in such a manner that the structure for each color is disposed parallel to the structures for the other colors.

Moreover, while a structure using shutter glasses for perceiving confidential images has been described as an example, the configuration is not necessarily a glass type as long as an optical shutter is disposed between the display portion and the user' eyes.

As mentioned above, the present invention may be modified variously.

BRIEF DESCRIPTION OF THE DRAWINGS

[FIG. 7] A view showing a structure of the image processing apparatus according to a second exemplary embodiment where the present invention is preferably carried out.

[FIG. 9] A view showing a structure of the apparatus executing an image processing method according to a fourth exemplary embodiment where the present invention is preferably carried out.

EXPLANATION OF REFERENCE NUMERALS

Figure 1:
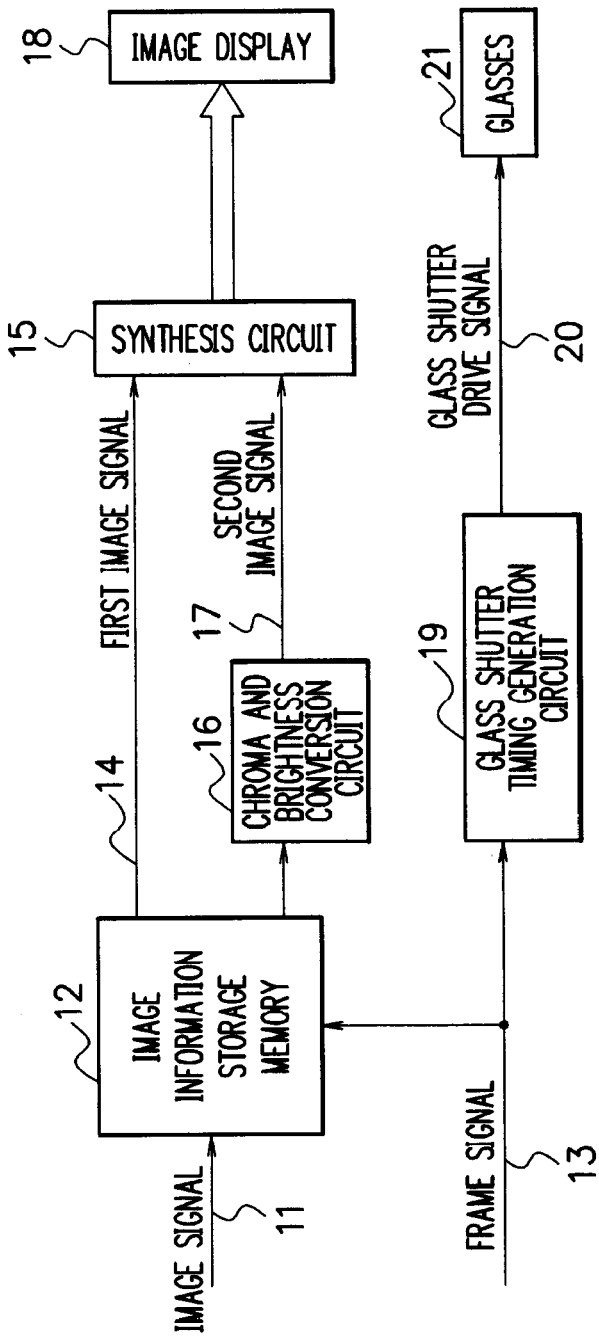
[FIG. 1] A view showing the structure of the image processing apparatus according to the related technology.
Figure 2:
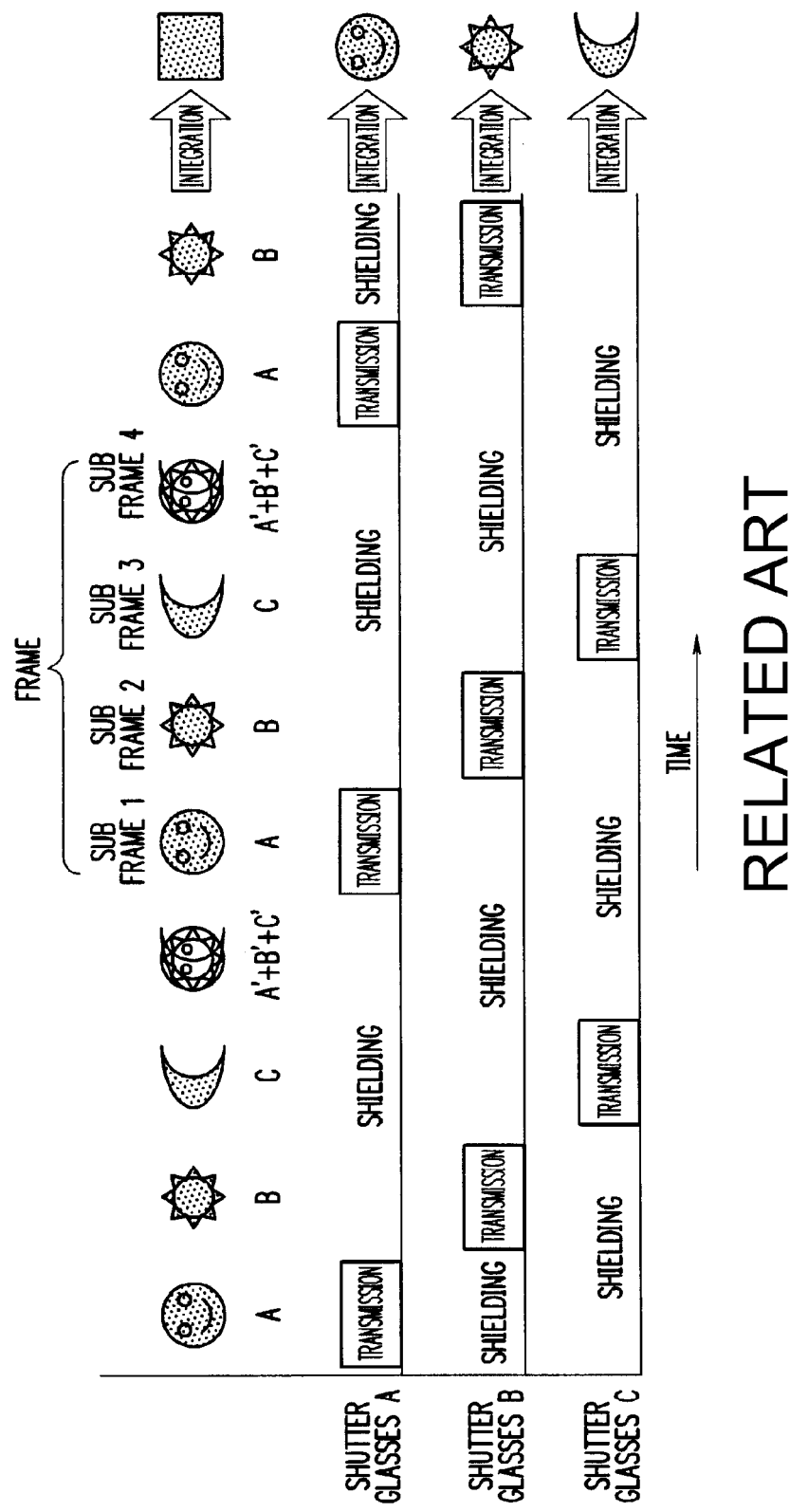
[FIG. 2] A view showing the display sequence and the light transmission and light shielding states of the shutter glasses for a plurality of persons to view different confidential images with one display apparatus according to the conventional method.
Figure 3:
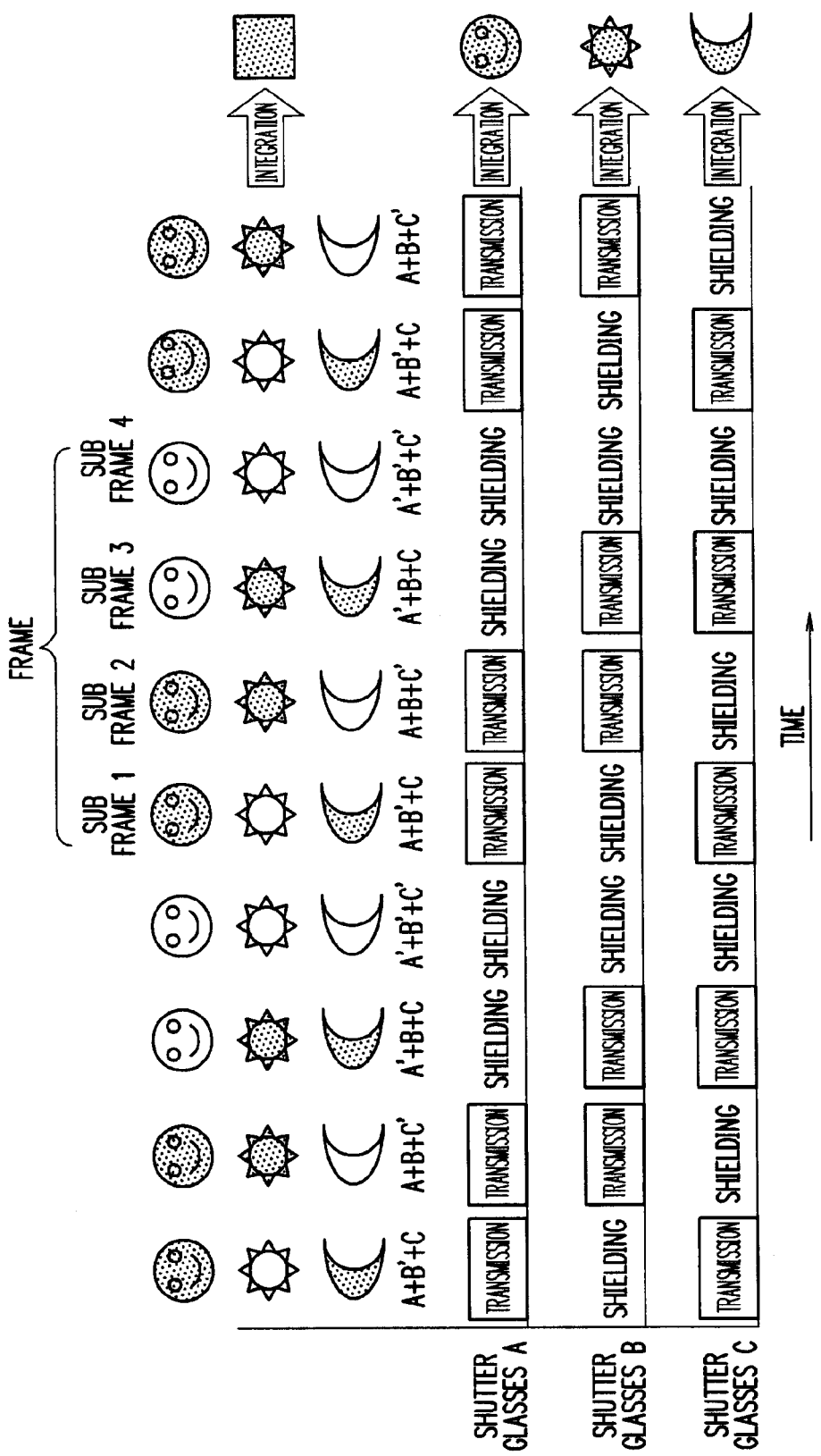
[FIG. 3] A view showing the display sequence and the light transmission and light shielding states of the shutter glasses for a plurality of persons to view different confidential images with one display apparatus according to the present invention.
Figure 4:
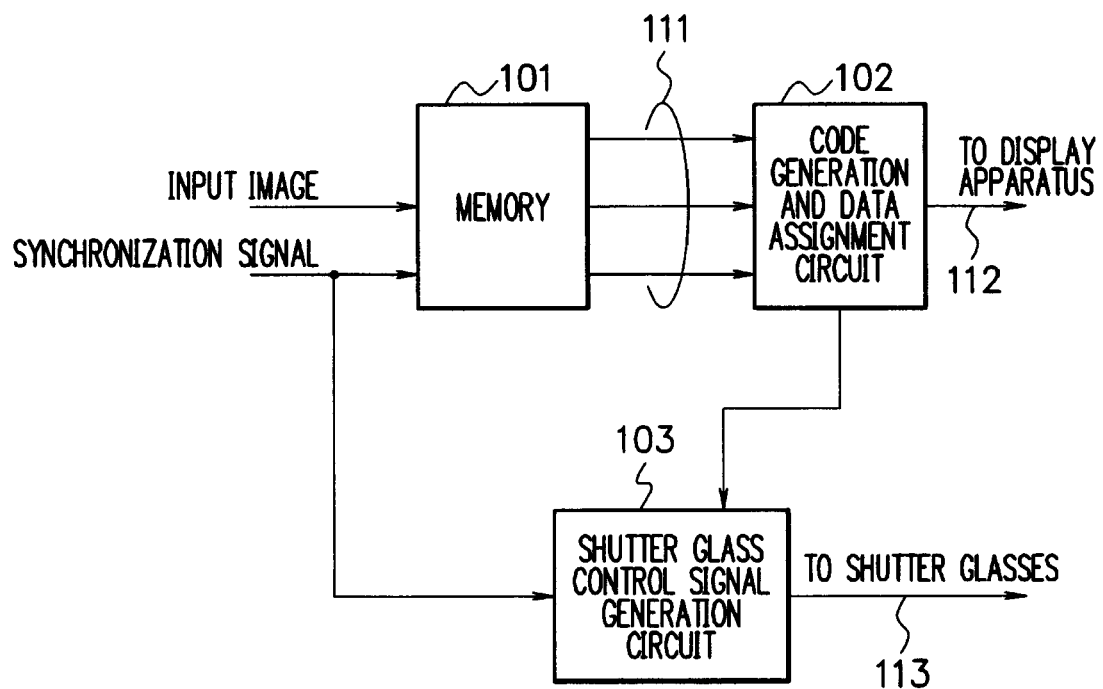
[FIG. 4] A view showing the structure of an image processing apparatus according to a first exemplary embodiment where the present invention is preferably carried out.
Figure 5:
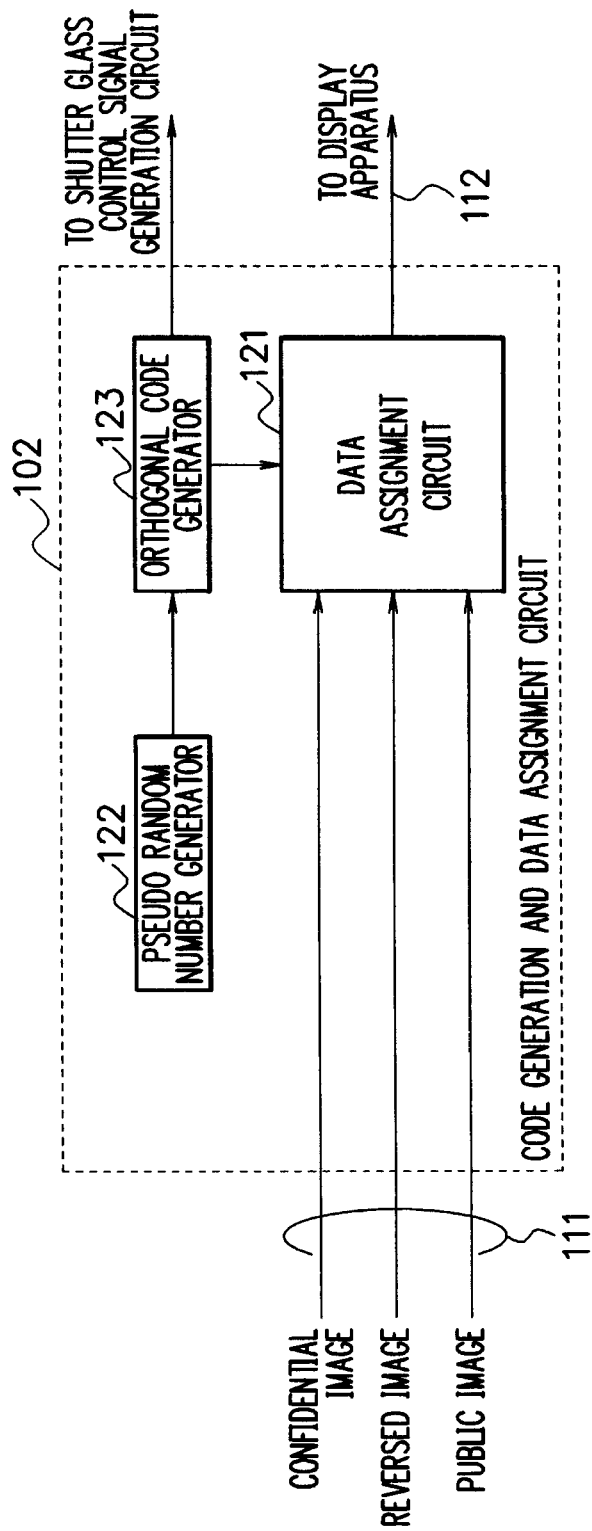
[FIG. 5] A view showing a structure of the code generation and data assignment circuit according to the first exemplary embodiment.
Figure 6:
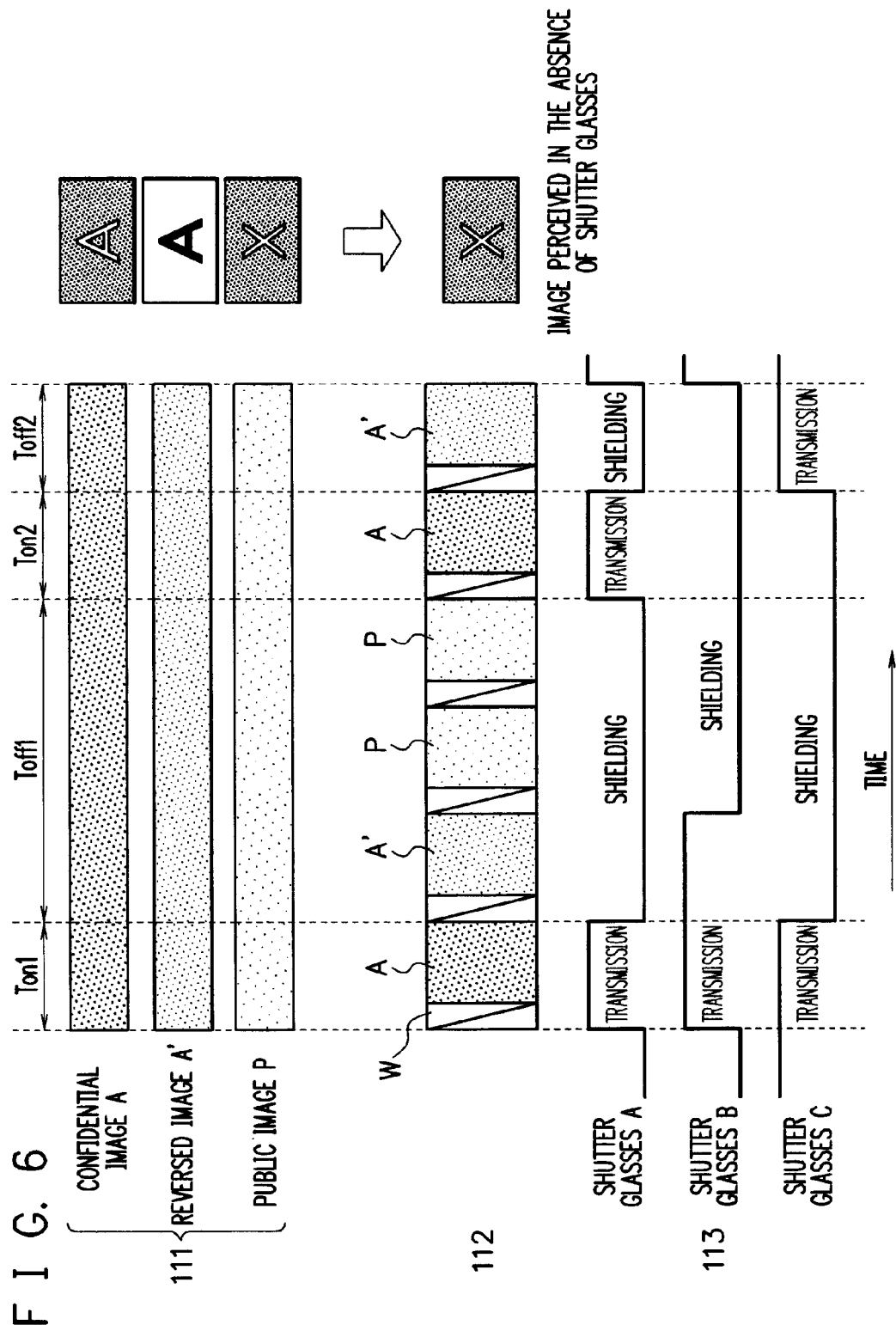
[FIG. 6] A view showing an example of the timing chart of each control signal of the image processing apparatus according to the first exemplary embodiment.
Figure 8:
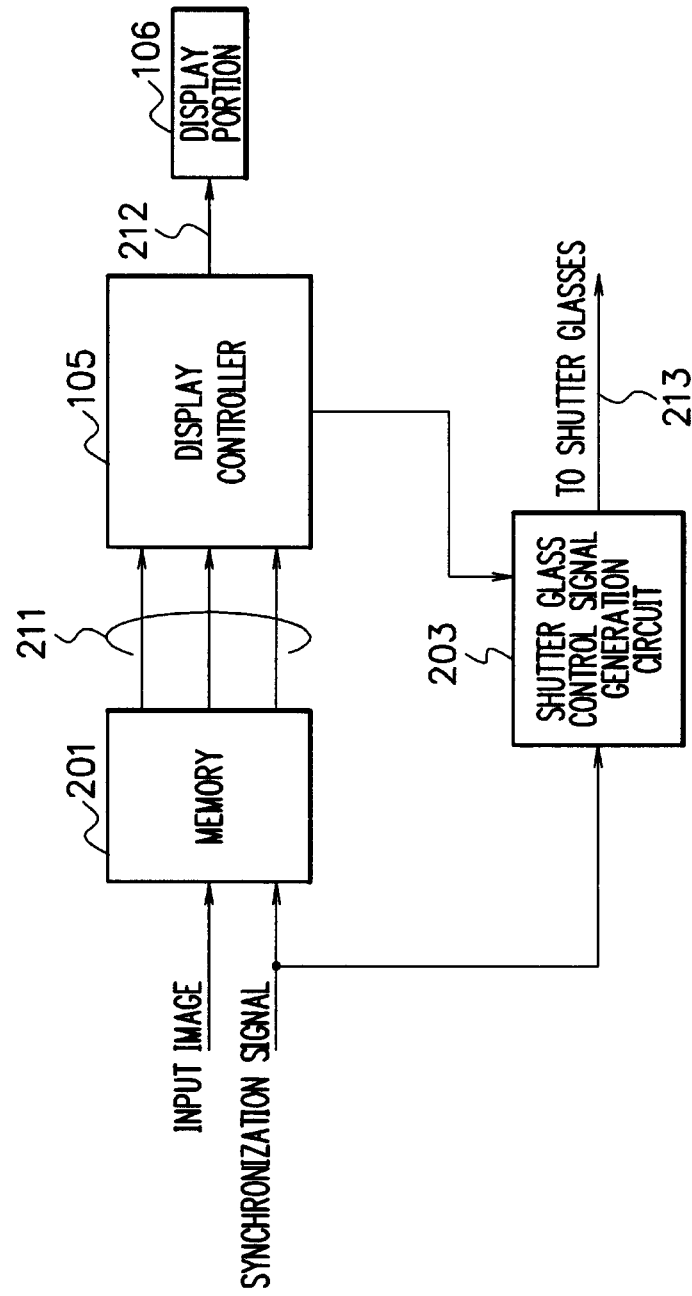
[FIG. 8] A view showing a structure of the display apparatus according to a third exemplary embodiment where the present invention is preferably carried out.
Figure 10:
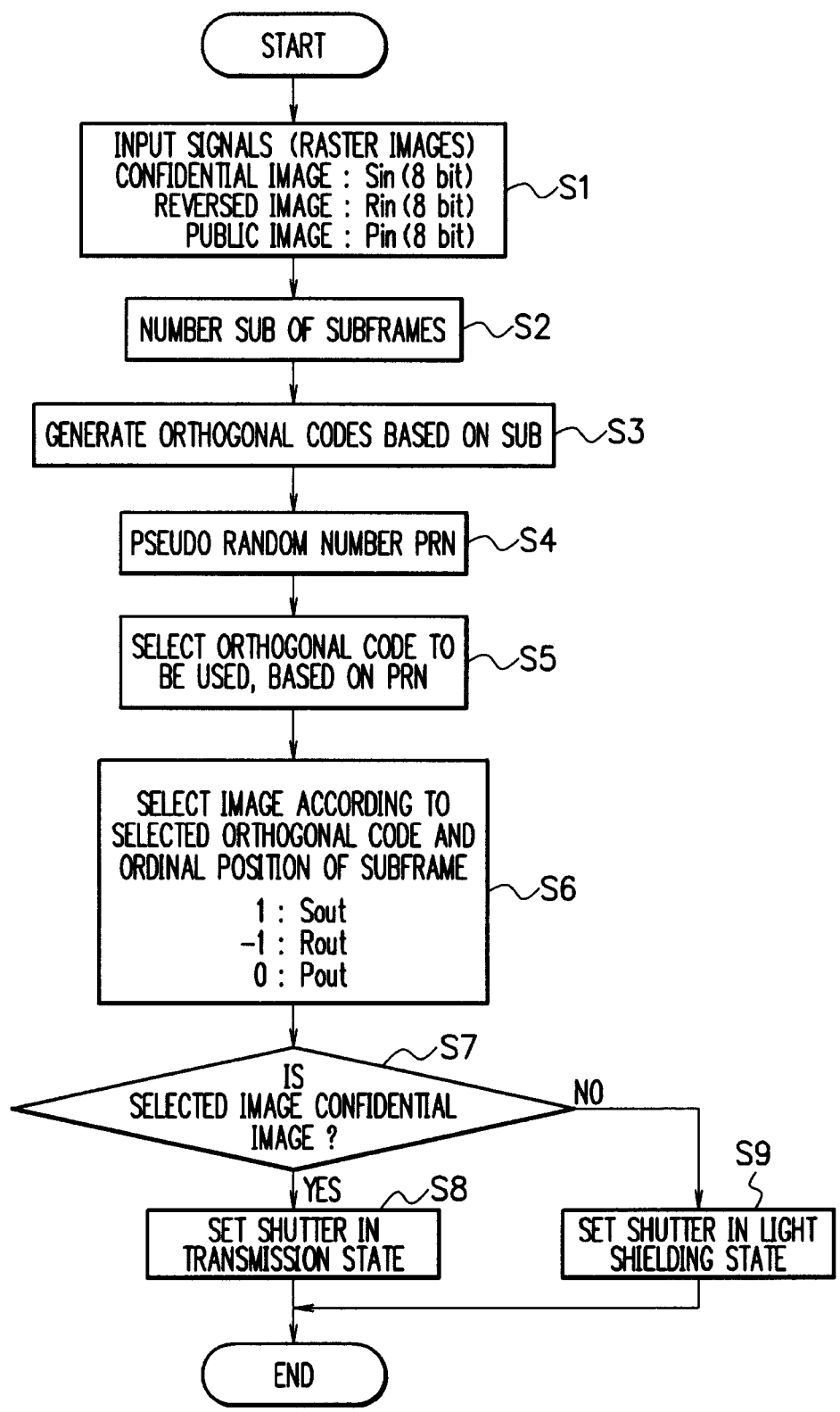
[FIG. 10] A flowchart showing a flow of the processing of the image processing method according to the fourth exemplary embodiment.

101 Memory
102 Code generation and data assignment circuit
103 Shutter glass control signal generator
104 Reversed image generator
105 Display controller
106 Display portion
111 Output signal (memory 101)
112 Output signal (code generation and data assignment circuit 102)
113 Output signal (shutter glass control signal generation circuit 103)
121 Data assignment circuit
122 Pseudo random number generator
123 Orthogonal code generator
131 Image processor

The invention claimed is:

1. An image processing apparatus that sequentially outputs at least two image signals,
wherein an image signal of a first output image and an image signal of a second output image are in a relationship such that when brightness values of the images are added together for each pixel, a resultant image has no correlation with the first output image,
an order in which the first output image and the second output image are displayed on each period in a time frame having a predetermined number of periods is set based on a corresponding element in an orthogonal code assigned to each frame, the orthogonal code being one of a set of a plurality of codes each having a predetermined number of elements, said plurality of codes being orthogonal to each other, and
the image processing apparatus includes an optical shutter control unit that controls so that during a period when an image signal of an image including at least part or all of the first output image is outputted, a shutter disposed between a display apparatus displaying the image corresponding to the image signal and user's eyes is set in a light transmission state and during a period when another image is displayed, the shutter is set in a light shielding state.

2. An image processing apparatus that sequentially outputs at least two image signals,
wherein the image processing apparatus includes a reversed image generation unit that generates a second output image so that an image signal of a first output image and an image signal of the second output image are in a relationship such that when brightness values of the images are added together for each pixel, a resultant image has no correlation with the first output image,
an order in which the first output image and the second output image are displayed on each period in a time frame having a predetermined number of periods is set based on a corresponding element in an orthogonal code assigned to each frame, the orthogonal code being one of a set of a plurality of codes each having a predetermined number of elements, said plurality of codes being orthogonal to each other, and
the image processing apparatus includes an optical shutter control unit that controls so that during a period when an image signal of an image including at least part or all of the first output image is outputted, a shutter disposed between a display apparatus displaying the image corresponding to the image signal and user's eyes is set in a light transmission state and during a period when another image is displayed, the shutter is set in a light shielding state.

3. The image processing apparatus according to claim 1, wherein the image signal of the first output image is outputted when an element value of the orthogonal code is "1", and the image signal of the second output image is outputted when the element value is "−1".

4. The image processing apparatus according to claim 1, wherein the image processing apparatus includes a unit that randomly changes the orthogonal code for each frame.

5. The image processing apparatus according to claim 1, wherein when the first element value of the orthogonal code used for a current frame and the last element value of the orthogonal code used for a preceding frame are the same value, the element value of the orthogonal code used for the current frame is reversed.

6. The image processing apparatus according to claim 1, wherein an image signal of a third output image is outputted together with the image signal of the second output image during the period when the shutter is set in the light shielding state.

7. An image processing method for sequentially outputting at least two image signals, comprising:
a step of setting an order in which a first output image and a second output image are displayed on each period in a time frame having a predetermined number of periods, based on a corresponding element in an orthogonal code assigned to each frame, the orthogonal code being one of a set of a plurality of codes each having a predetermined number of elements, said plurality of codes being orthogonal to each other; and
an optical shutter control step of controlling so that during a period when an image signal of an image including at least part or all of the first output image is outputted, a shutter disposed between a display apparatus displaying the image corresponding to the image signal and user's eyes is set in a light transmission state and during a period when another image is displayed, the shutter is set in a light shielding state,
wherein an image signal of the first output image and an image signal of the second output image are in a relationship such that when brightness values of the images are added together for each pixel, a resultant image has no correlation with the first output image.

8. An image processing method for sequentially outputting at least two image signals, comprising:
a reversed image generation step of generating a second output image so that an image signal of a first output image and an image signal of the second output image are in a relationship such that when brightness values of the images are added together for each pixel, a resultant image has no correlation with the first output image;
a step of setting an order in which the first output image and the second output image are displayed on each period in a time e frame having a predetermined number of periods, based on a corresponding element in an orthogonal code assigned to each frame, the orthogonal code being one of a set of a plurality of codes each having a predetermined number of elements, said plurality of codes being orthogonal to each other; and
an optical shutter control step of controlling so that during a period when an image signal of an image including at least part or all of the first output image is outputted, a shutter disposed between a display apparatus displaying the image corresponding to the image signal and user's eyes is set in a light transmission state and during a period when another image is displayed, the shutter is set in a light shielding state.

9. The image processing method according to claim 7, wherein the image signal of the first output image is outputted when an element value of the orthogonal code is "1", and the image signal of the second output image is outputted when the element value is "−1".

10. The image processing method according to claim 7, wherein the image processing method includes a step of randomly changing the orthogonal code for each frame.

11. The image processing method according to claim 7, wherein when the first element value of the orthogonal code used for a current frame and the last element value of the orthogonal code used for a preceding frame are the same value, the element value of the orthogonal code used for the current frame is reversed.

12. The image processing method according to claim 7, wherein an image signal of a third output image is outputted together with the image signal of the second output image during the period when the shutter is set in the light shielding state.

13. A non-transitory computer-readable storage medium for storing an image processing program that causes a computer to execute the image processing method according to claim 7.

14. A display apparatus that sequentially displays images corresponding to at least two image signals, by a display unit,
wherein an image signal of a first output image and an image signal of a second output image are in a relationship such that when brightness values of the images are added together for each pixel, a resultant image has no correlation with the first output image,
an order in which the first output image and the second output image are displayed on each period in a time frame having a predetermined number of periods is set based on a corresponding element in an orthogonal code assigned to each frame, the orthogonal code being one of a set of a plurality of codes each having a predetermined number of elements, said plurality of codes being orthogonal to each other, and the display apparatus includes an optical shutter control so that during a period when an image signal of an image including at least part or all of the first output image is outputted, a shutter disposed between the display unit and user's eyes is set in a light transmission state and during a period when another image is displayed, the shutter is set in a light shielding state.

15. A display apparatus that sequentially displays images corresponding to at least two image signals, by a display unit,
wherein the display apparatus includes a reversed image generation unit that generates a second output image so that an image signal of a first output image and an image signal of the second output image are in a relationship such that when brightness values of the images are added together for each pixel, a resultant image has no correlation with the first output image, an order in which the first output image and the second output image are displayed on each period in a time frame having a predetermined number of periods is set based on a corresponding element in an orthogonal code assigned to each frame, the orthogonal code being one of a set of a plurality of codes each having a predetermined number of elements, said plurality of codes being orthogonal to each other, and the display apparatus includes an optical shutter control unit that controls so that during a period when an image signal of an image including at least part or all of the first output image is outputted, a shutter disposed between the display unit and user's eyes is set in a light transmission state and during a period when another image is displayed, the shutter is set in a light shielding state.

16. The image processing apparatus according to claim 2, wherein the image signal of the first output image is outputted when an element value of the orthogonal code is "1", and the image signal of the second output image is outputted when the element value is "−1".

17. The image processing apparatus according to claim 2, wherein the image processing apparatus includes a unit randomly changes the orthogonal code for each frame.

18. The image processing apparatus according to claim 2, wherein when the first element value of the orthogonal code used for a current frame and the last element value of the orthogonal code used for a preceding frame are the same value, the element value of the orthogonal code used for the current frame is reversed.

19. The image processing apparatus according to claim 2, wherein an image signal of a third output image is outputted together with the image signal of the second output image during the period when the shutter is set in the light shielding state.

20. The image processing method according to claim 8, wherein the image signal of the first output image is outputted when an element value of the orthogonal code is "1", and the image signal of the second output image is outputted when the element value is "−1".

21. The image processing method according to claim 8, wherein the image processing method includes a step of randomly changing the orthogonal code for each frame.

22. The image processing method according to claim 8, wherein when the first element value of the orthogonal code used for a current frame and the last element value of the orthogonal code used for a preceding frame are the same value, the element value of the orthogonal code used for the current frame is reversed.

23. The image processing method according to claim 8, wherein an image signal of a third output image is outputted together with the image signal of the second output image during the period when the shutter is set in the light shielding state.

24. A non-transitory computer-readable storing medium for storing an image processing program that causes a computer to execute the image processing method according to claim 8.

25. An image processing apparatus that sequentially outputs at least two image signals,
wherein an image signal of a first output image and an image signal of a second output image are in a relationship such that when brightness values of the images are added together for each pixel, a resultant image has no correlation with the first output image, an order in which the first output image and the second output image are displayed on each period in a time frame having a predetermined number of periods is set based on a corresponding element in an orthogonal code assigned to each frame, the orthogonal code being one of a set of a plurality of codes each having a predetermined number of elements, said plurality of codes being orthogonal to each other, and the image processing apparatus includes optical shutter control means for controlling so that during a period when an image signal of an image including at least part or all of the first output image is outputted, a shutter disposed between a display apparatus displaying the image corresponding to the image signal and user's eyes is set in a light transmission state and during a period when another image is displayed, the shutter is set in a light shielding state.

26. An image processing apparatus that sequentially outputs at least two image signals,
wherein the image processing apparatus includes reversed image generation means for generating a second output image so that an image signal of a first output image and an image signal of the second output image are in a relationship such that when brightness values of the images are added together for each pixel, a resultant image has no correlation with the first output image, an order in which the first output image and the second output image are displayed on each period in a time frame having a predetermined number of periods is set based on a corresponding element in an orthogonal code assigned to each frame, the orthogonal code being one of a set of a plurality of codes each having a predetermined number of elements, said plurality of codes being orthogonal to each other, and the image processing apparatus includes optical shutter control means for controlling so that during a period when an image signal of an image including at least part or all of the first output image is outputted, a shutter disposed between a display apparatus displaying the image corresponding to the image signal and user's eyes is set in a light transmission state and during a period when another image is displayed, the shutter is set in a light shielding state.

27. A display apparatus that sequentially displays images corresponding to at least two image signals, by display means,
wherein an image signal of a first output image and an image signal of a second output image are in a relationship such that when brightness values of the images are added together for each pixel, a resultant image has no correlation with the first output image, an order in which the first output image and the second output image are displayed on each period in a time frame having a predetermined number of periods is set based on a corresponding element in an orthogonal code assigned to each frame, the orthogonal code being one of a set of a plurality of codes each having a predetermined number of elements, said plurality of codes being orthogonal to each other, and the display apparatus includes optical shutter control means for controlling so that during a period when an image signal of an image including at least part or all of the first output image is outputted, a shutter disposed between the display means and user's eyes is set in a light transmission state and during a period when another image is displayed, the shutter is set in a light shielding state.

28. A display apparatus that sequentially displays images corresponding to at least two image signals, by display means, wherein the display apparatus includes reversed image generation means for generating a second output image so that an image signal of a first output image and an image signal of the second output image are in a relationship such that when brightness values of the images are added together for each pixel, a resultant image has no correlation with the first output image, an order in which the first output image and the second output image are displayed on each period in a time frame having a predetermined number of periods is set based on a corresponding element in an orthogonal code assigned to each frame, the orthogonal code being one of a set of a plurality of codes each having a predetermined number of elements, said plurality of codes being orthogonal to each other, and the display apparatus includes optical shutter control means for controlling so that during a period when an image signal of an image including at least part or all of the first output image is outputted, a shutter disposed between the display means and user's eyes is set in a light transmission state and during a period when another image is displayed, the shutter is set in a light shielding state.

* * * * *